(12) United States Patent
Yamamoto et al.

(10) Patent No.: US 6,968,095 B1
(45) Date of Patent: Nov. 22, 2005

(54) IMAGE SEARCH APPARATUS AND METHOD, AND COMPUTER READABLE MEMORY

(75) Inventors: Kunihiro Yamamoto, Yokohama (JP); Kentaro Matsumoto, Higashikurume (JP); Kiyoshi Kusama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/384,967

(22) Filed: Aug. 30, 1999

(30) Foreign Application Priority Data

| Aug. 31, 1998 | (JP) | ................................. 10-244586 |
| Aug. 31, 1998 | (JP) | ................................. 10-244588 |
| Jul. 28, 1999 | (JP) | ................................. 11-214265 |

(51) Int. Cl.$^7$ ........................... G06K 9/54; G09G 5/00; G06F 17/30
(52) U.S. Cl. ...................... 382/305; 382/162; 345/700; 707/3
(58) Field of Search ................................ 382/305, 162, 382/163, 165, 167, 274, 284, 170, 168, 278; 707/1–8, 707/502; 345/835, 700, 759, 770

(56) References Cited

U.S. PATENT DOCUMENTS

| 5,038,298 | A | | 8/1991 | Matsumoto et al. ........ 364/518 |
| 5,157,773 | A | | 10/1992 | Matsumoto et al. ........ 395/375 |
| 5,508,718 | A | * | 4/1996 | Haikin ........................ 345/601 |
| 5,751,286 | A | * | 5/1998 | Barber et al. ................ 345/835 |
| 5,802,361 | A | * | 9/1998 | Wang et al. ................. 382/217 |
| 5,915,250 | A | * | 6/1999 | Jain et al. .................... 707/100 |
| 5,930,783 | A | * | 7/1999 | Li et al. ......................... 707/1 |
| 5,943,054 | A | * | 8/1999 | Hirano et al. ............... 345/348 |
| 6,181,818 | B1 | * | 1/2001 | Sato et al. ................... 382/170 |
| 6,182,069 | B1 | * | 1/2001 | Niblack et al. ................ 707/6 |
| 6,237,010 | B1 | * | 5/2001 | Hui et al. .................... 707/502 |
| 6,246,804 | B1 | * | 6/2001 | Sato et al. ................... 382/284 |
| 6,247,009 | B1 | * | 6/2001 | Shiiyama et al. .............. 707/3 |
| 6,249,607 | B1 | * | 6/2001 | Murakawa ................... 382/199 |
| 6,345,274 | B1 | * | 2/2002 | Zhu et al. ...................... 707/5 |
| 6,345,275 | B2 | * | 2/2002 | Lee .............................. 707/6 |
| 6,400,853 | B1 | * | 6/2002 | Shiiyama .................... 382/305 |
| 6,415,282 | B1 | * | 7/2002 | Mukherjea et al. ............ 707/3 |

\* cited by examiner

*Primary Examiner*—Kanjibhai Patel
(74) *Attorney, Agent, or Firm*—Fitzpatrick, Cella, Harper & Scinto

(57) ABSTRACT

A plurality of image data are stored in a hard disk device in correspondence with their image feature amounts. An image is input using an input window. A CPU computes the image feature amount of the input image. The CPU also computes image similarity on the basis of the computed image feature amount and those of image data stored in the hard disk device. A list of image data as search results are displayed on a display unit on the basis of the computed image similarity. Image data stored in the hard disk device are read out into the input window.

31 Claims, 10 Drawing Sheets

IMAGE SEARCH APPARATUS AND METHOD, AND COMPUTER READABLE MEMORY

BACKGROUND OF THE INVENTION

The present invention relates to an image search apparatus and method for searching an image database that stores a plurality of image data for desired image data, and a computer readable memory.

Various image search apparatuses for searching databases which store a large number of image data for desired image data have been proposed. The search methods used in these image search apparatuses are roughly classified into two methods:

a method of storing non-image information such as keywords, photographing dates, and the like in association with image data, and conducting a search based on such information; and a method of conducting a search on the basis of the image feature amounts (luminance/color difference information, image frequency, histogram, and the like) of image data itself.

In the latter method, a method of submitting certain image data, and searching image data using the image feature amounts of that image data as query keys is called similar image search. This method can effectively provide a search interface which is friendly to a user who has no special knowledge about image processing.

However, when a handwritten illustration is used as a query criteria in a similar image search, a desired image cannot be obtained unless an appropriate illustration is drawn, thus requiring drawing skills or troublesome works in drawing. Also, a desired image cannot be obtained unless colors used in drawing are appropriate. Furthermore, the color to be used is normally designated on the basis of numerical values such as R, G, and B luminance values, or the like. However, it is not easy for the user who has no knowledge about the image processing to immediately understood such values, thus disabling efficient search operation.

SUMMARY OF THE INVENTION

The present invention has been made in consideration of the aforementioned problems, and has as its object to provide an image search apparatus and method, which can quickly reflect user's will, and can efficiently make an image search, and a computer readable memory.

In order to achieve the above object, an image search apparatus according to the present invention comprises the following arrangement.

That is, an image search apparatus for searching an image database that stores a plurality of image data for desired image data, comprises:

storage means for storing the plurality of image data in correspondence with image feature amounts of the image data;

input means for inputting an image using an input window;

image feature amount computing means for computing an image feature amount of the image input by the input means;

image similarity computing means for computing image similarity on the basis of the image feature amount computed by the image feature amount computing means, and the image feature amounts of the image data stored in the storage means;

image display means for displaying a list of image data as search results on the basis of the image similarity computed by the image similarity computing means; and read-out means for reading out the image data stored in the storage means into the input window.

In order to achieve the above object, an image search method according to the present invention comprises the following arrangement.

That is, an image search method for searching an image database that stores a plurality of image data for desired image data, comprises:

the storage step of storing the plurality of image data in a storage medium in correspondence with image feature amounts of the image data;

the image feature amount computing step of computing an image feature amount of an image input on an input window;

the image similarity computing step of computing image similarity on the basis of the image feature amount computed in the image feature amount computing step, and the image feature amounts of the image data stored in the storage medium in the storage step;

the image display step of displaying a list of image data as search results on the basis of the image similarity computed in the image similarity computing step; and the read-out step of reading out the image data stored in the storage step into the input window.

In order to achieve the above object, a computer readable memory according to the present invention comprises the following arrangement.

That is, a computer readable memory that stores a program code of an image search for searching an image database that stores a plurality of image data for desired image data, comprises:

a program code of the storage step of storing the plurality of image data in a storage medium in correspondence with image feature amounts of the image data;

a program code of the image feature amount computing step of computing an image feature amount of an image input on an input window;

a program code of the image similarity computing step of computing image similarity on the basis of the image feature amount computed in the image feature amount computing step, and the image feature amounts of the image data stored in the storage medium in the storage step;

a program code of the image display step of displaying a list of image data as search results on the basis of the image similarity computed in the image similarity computing step; and a program code of the read-out step of reading out the image data stored in the storage step into the input window.

In order to achieve the above object, an image search apparatus according to the present invention comprises the following arrangement.

That is, an image search apparatus for searching an image database that stores a plurality of image data for desired image data, comprises:

storage means for storing the plurality of image data in correspondence with image feature amounts of the image data;

input means for inputting an image using an input window;

image feature amount computing means for computing an image feature amount of the image input by the input means;

image similarity computing means for computing image similarity on the basis of the image feature amount computed by the image feature amount computing means, and the image feature amounts of the image data stored in the storage means;

image display means for displaying a list of image data as search results on the basis of the image similarity computed by the image similarity computing means; and designation means for designating a color used in the image to be drawn by the input means on the basis of the image data displayed by the image display means.

In order to achieve the above object, an image search method according to the present invention comprises the following arrangement.

That is, an image search method for searching an image database that stores a plurality of image data for desired image data, comprises:

the storage step of storing the plurality of image data in a storage medium in correspondence with image feature amounts of the image data;

the image feature amount computing step of computing an image feature amount of an image input on an input window;

the image similarity computing step of computing image similarity on the basis of the image feature amount computed in the image feature amount computing step, and the image feature amounts of the image data stored in the storage medium in the storage step;

the image display step of displaying a list of image data as search results on the basis of the image similarity computed in the image similarity computing step; and the designation step of designating a color used in the image to be drawn on the input window on the basis of the image data displayed in the image display step.

In order to achieve the above object, a computer readable memory according to the present invention comprises the following arrangement.

That is, a computer readable memory that stores a program code of an image search for searching an image database that stores a plurality of image data for desired image data, comprises:

a program code of the storage step of storing the plurality of image data in a storage medium in correspondence with image feature amounts of the image data;

a program code of the image feature amount computing step of computing an image feature amount of an image input on an input window;

a program code of the image similarity computing step of computing image similarity on the basis of the image feature amount computed in the image feature amount computing step, and the image feature amounts of the image data stored in the storage medium in the storage step;

a program code of the image display step of displaying a list of image data as search results on the basis of the image similarity computed in the image similarity computing step; and a program code of the designation step of designating a color used in the image to be drawn on the input window on the basis of the image data displayed in the image display step.

In order to achieve the above object, an image search apparatus according to the present invention comprises the following arrangement.

That is, an image search apparatus for searching an image database that stores a plurality of image data for desired image data, comprises:

storage means for storing the plurality of image data in correspondence with image feature amounts of the image data;

selection means for selecting one of a plurality of different input methods;

input means for inputting an image using the input method selected by the selection means;

image feature amount computing means for computing an image feature amount of the image input by the input means;

image similarity computing means for computing image similarity on the basis of the image feature amount computed by the image feature amount computing means, and the image feature amounts of the image data stored in the storage means; and image display means for displaying a list of image data as search results on the basis of the image similarity computed by the image similarity computing means.

In order to achieve the above object, an image search method according to the present invention comprises the following arrangement.

That is, an image search method for searching an image database that stores a plurality of image data for desired image data, comprises:

the storage step of storing the plurality of image data in a storage medium in correspondence with image feature amounts of the image data;

the selection step of selecting one of a plurality of different input methods;

the input step of inputting an image using the input method selected in the selection step;

the image feature amount computing step of computing an image feature amount of an image input in the input step;

the image similarity computing step of computing image similarity on the basis of the image feature amount computed in the image feature amount computing step, and the image feature amounts of the image data stored in the storage medium in the storage step; and the image display step of displaying a list of image data as search results on the basis of the image similarity computed in the image similarity computing step.

In order to achieve the above object, a computer readable memory according to the present invention comprises the following arrangement.

That is, a computer readable memory that stores a program code of an image search for searching an image database that stores a plurality of image data for desired image data, comprises:

a program code of the storage step of storing the plurality of image data in a storage medium in correspondence with image feature amounts of the image data;

a program code of the selection step of selecting one of a plurality of different input methods;

a program code of the input step of inputting an image using the input method selected in the selection step;

a program code of the image feature amount computing step of computing an image feature amount of an image input in the input step;

a program code of the image similarity computing step of computing image similarity on the basis of the image feature amount computed in the image feature amount computing step, and the image feature amounts of the image data stored in the storage medium in the storage step; and a program code of the image display step of displaying a list of image data as search results on the basis of the image similarity computed in the image similarity computing step.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The preferred embodiments of the present invention will be described in detail hereinafter with reference to the accompanying drawings.

First Embodiment

Figure 1:
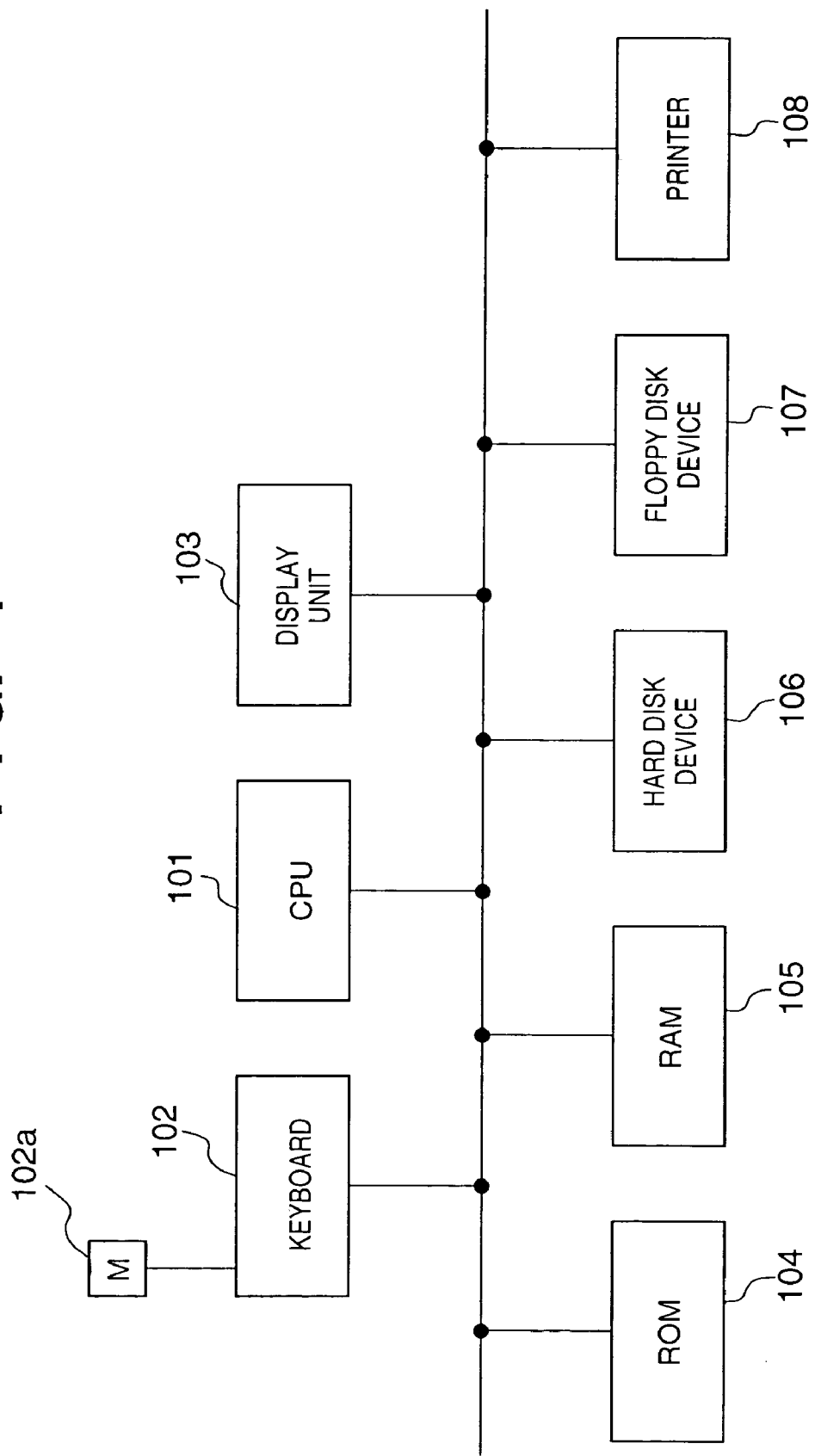
FIG. 1 is a block diagram showing the arrangement of an image search apparatus according to the first embodiment of the present invention.

FIG. 1 is a block diagram showing the arrangement of an image search apparatus according to the first embodiment.

Referring to FIG. 1, reference numeral 101 denotes a CPU for controlling the entire system. Reference numeral 102 denotes a keyboard; and 102a, a pointing device (mouse). The keyboard 102 is used together with the mouse for inputting data into the system and drawing an illustration which is used as a query criteria for a similar image search. Reference numeral 103 denotes a display unit which comprises a CRT, liquid crystal display, or the like, and displays a user interface used for drawing an image serving as a query criteria, and image data as a search result, and the like. Reference numeral 104 denotes a ROM; and 105, a RAM. These ROM and RAM construct a memory device of the system, and store programs executed by the system and data used by the system. Reference numeral 106 denotes a hard disk device; and 107, a floppy disk device. The hard disk device and floppy disk device construct an external storage device used as a file system of the system. The hard disk device 106 stores a plurality of image data to be searched. Reference numeral 108 denotes a printer for recording an image or the like displayed on the display unit 103 on a recording medium.

The control window displayed on the display unit 103 upon executing the search process of the first embodiment will be explained below with reference to FIG. 2.

Figure 2:
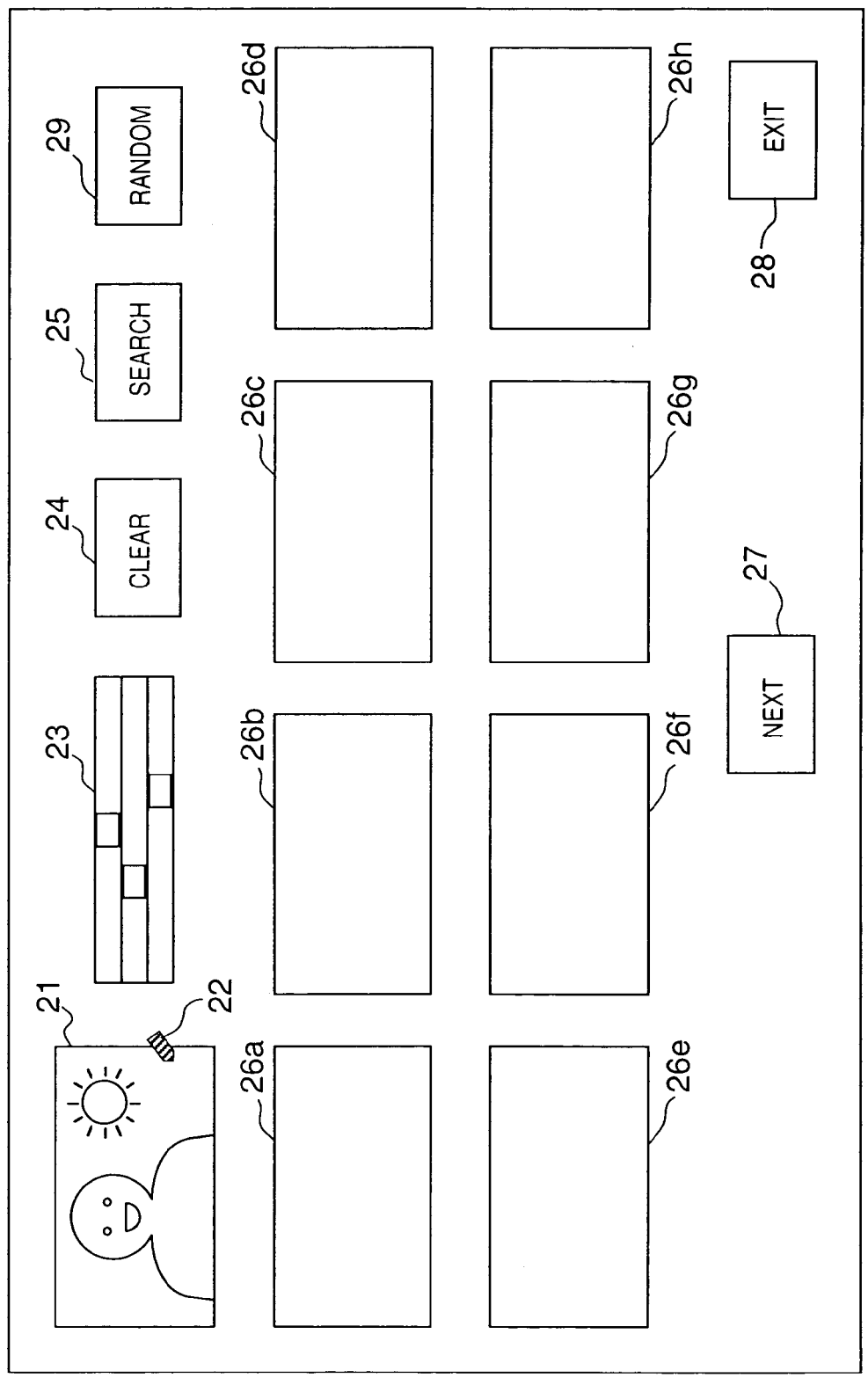
FIG. 2 shows a control window displayed on a display unit upon executing a search process of the first embodiment.

FIG. 2 shows the control window displayed on the display unit upon executing the search process in the first embodiment.

Reference numeral 21 denotes a user drawing area; 22, a cursor; 23, color selection scroll bars; 24, a clear button; 25, a search button; 27, a next candidate display button; and 28, a processing end button. Also, reference numerals 26a to 26h denote areas for displaying icon images corresponding to image data as search results. Reference numeral 29 denotes a random button.

The user can draw an illustration, which is similar to the image wanted and used as a query criteria, on the user drawing area 21 using the drawing tools implemented by software. The software process upon drawing an illustration will be briefly described below.

The color selection scroll bars 23 are used for selecting a pen color used in drawing, and designate R, G, and B values in turn from the uppermost one. Upon pressing the clear button 24, the entire user drawing area 21 is painted in white. The user moves the cursor 22 using the pointing device 102a and can draw a free curve on the user drawing area 21. Upon pressing the processing end button 28, the control window is closed, and the processing ends. Upon pressing the random button 29, image data stored in the hard disk device 106 are randomly selected, and icon images corresponding to the selected image data are displayed on the areas 26a to 26h.

An outline of the processes executed by the image search apparatus of the first embodiment will be explained below with reference to FIG. 3.

Figure 3:
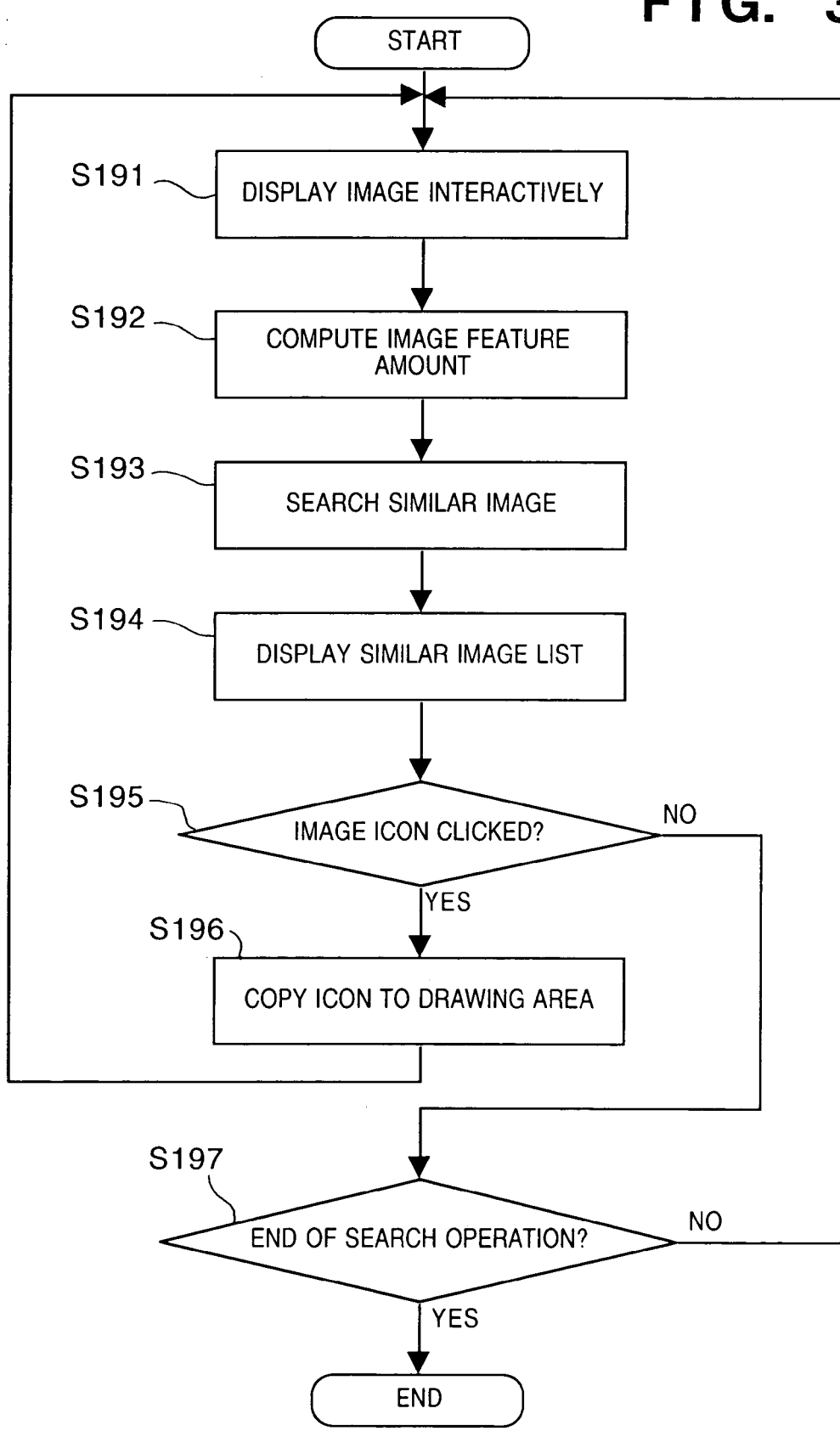
FIG. 3 is a flow chart showing an outline of the processes executed by the image search apparatus of the first embodiment.

FIG. 3 is a flow chart showing an outline of the processes executed by the image search apparatus of the first embodiment.

In step S191, the user draws an illustration, which is similar to the image data wanted and stored on the hard disk device 106, and is used as a query criteria, on the display unit 103. In step S192, the image feature amount of the drawn illustration is computed. In step S193, a similar image search is made on the basis of the computed image feature amount. In step S194, similar images (icon images) found by search are displayed on the display unit 103. It is then checked in step S195 if the user has clicked a given displayed icon image using the pointing device 102a. If the user has clicked the icon image (YES in step S195), the flow advances to step S196. On the other hand, if the user has not clicked any icon image (NO in step S195), the flow advances to step S197.

In step S196, the icon image selected in step S195 is copied onto the user drawing area 21, and the flow returns to step S192.

It is checked in step S197 if search operation is to end. If search operation is not to end (NO in step S197), the flow returns to step S191. On the other hand, if search operation is to end (YES in step S197), the processing ends.

With the above-mentioned processes, if the list of icon images displayed as the search results contains an image which is close to a desired image, the user need only click that icon image, and the selected icon image is copied onto the user drawing area 21. The user can modify the copied image to generate a new illustration (image) used as a query criteria, and can make a similar image search again. At the instance of clicking that illustration (image), a similar image search is automatically started using the illustration (image) as a query criteria.

The details of the processes executed in the individual steps will be described below.

{Description of Step S191}

In step S191, the user draws an illustration, which is used as a query criteria, on the user drawing area 21, and the flow advances to the next step S192 at an appropriate timing. The process at that time will be explained below with reference to FIG. 4. At that timing, the system monitors the movement of the mouse 102a, and every time a movement is monitored, the image feature amount of the image drawn so far is computed.

Figure 4:
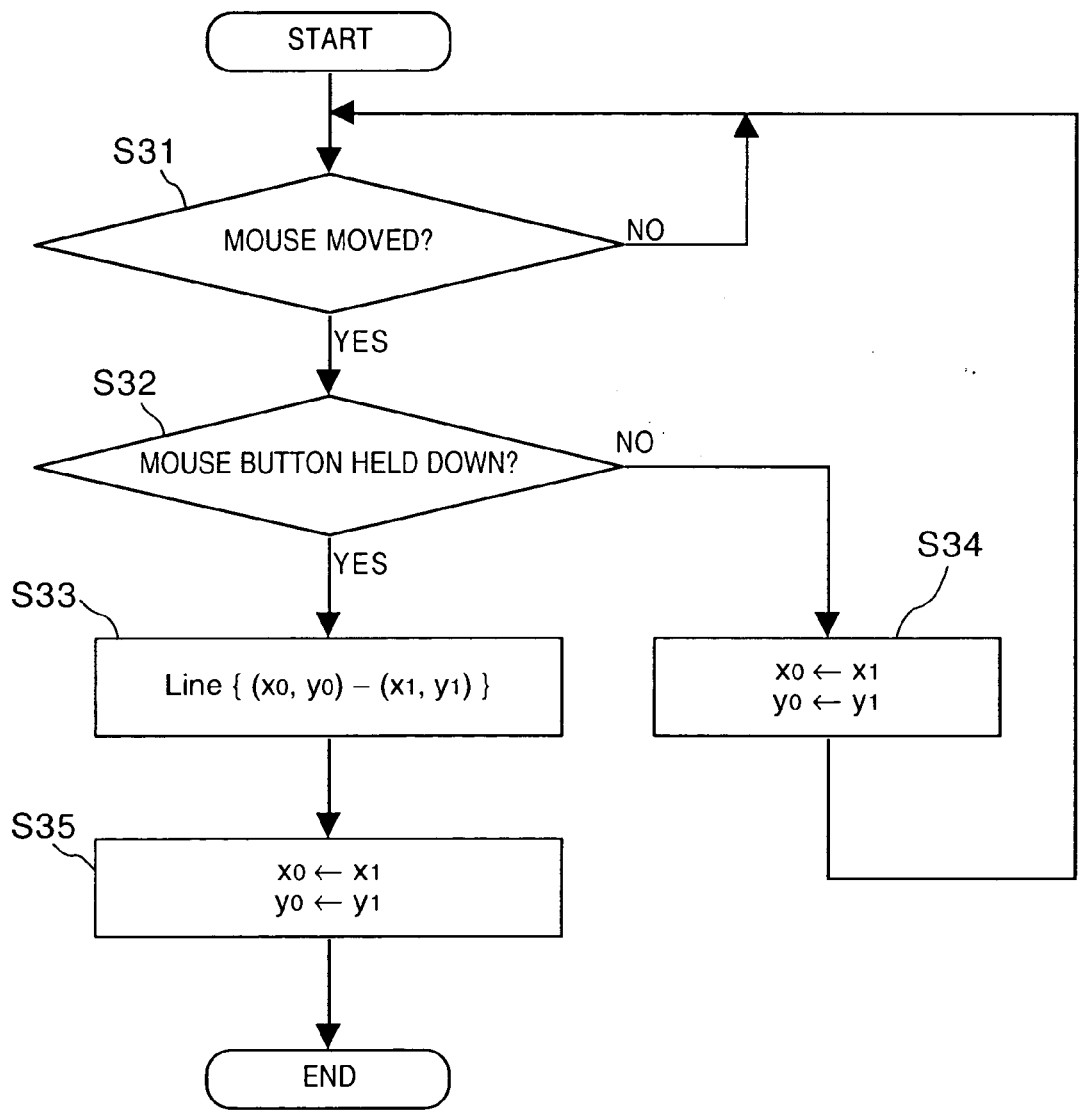
FIG. 4 is a flow chart showing the details of the process executed in step S191 in the first embodiment.

FIG. 4 is a flow chart showing the details of the process executed in step S191 in the first embodiment.

Note that x0 and y0 are variables for storing the previous position of the cursor 22, and x1 and y1 are variables that store the current position of the cursor 22.

It is checked in step S31 if the user has moved the mouse 102a. If the user has not moved the mouse yet (NO in step S31), the flow returns to step S31. That is, the process in this step forms a loop for monitoring the movement of the mouse 102a. On the other hand, if the user has moved the mouse (YES in step S31), the flow advances to step S32.

It is checked in step S32 if the mouse button of the mouse 102a is being held down. If the mouse button is not held down (NO in step S32), the flow advances to step S34 to substitute the current position (x1, y1) of the cursor 22 in (x0, y0), and the flow returns to step S31. In this manner, the cursor 22 alone can be moved without drawing any stroke.

On the other hand, if the mouse button is being held down (YES in step S32), i.e., if the user is dragging the mouse, the flow advances to step S33. In step S33, a line is drawn between the previous position (x0, y0) and the current position (x1, y1) of the cursor 22 in a color determined by the color selection scroll bars 23.

In step S35, the current position (x1, y1) of the cursor 22 is substituted in (x0, y0) to end step S191, and the flow advances to step S192.

This process makes the user feel as if a search were automatically executed every time he or she adds a stroke to the illustration.

{Description of Step S192}

In step S192, the image feature amount of the illustration drawn in step S191 is computed.

Figure 5:
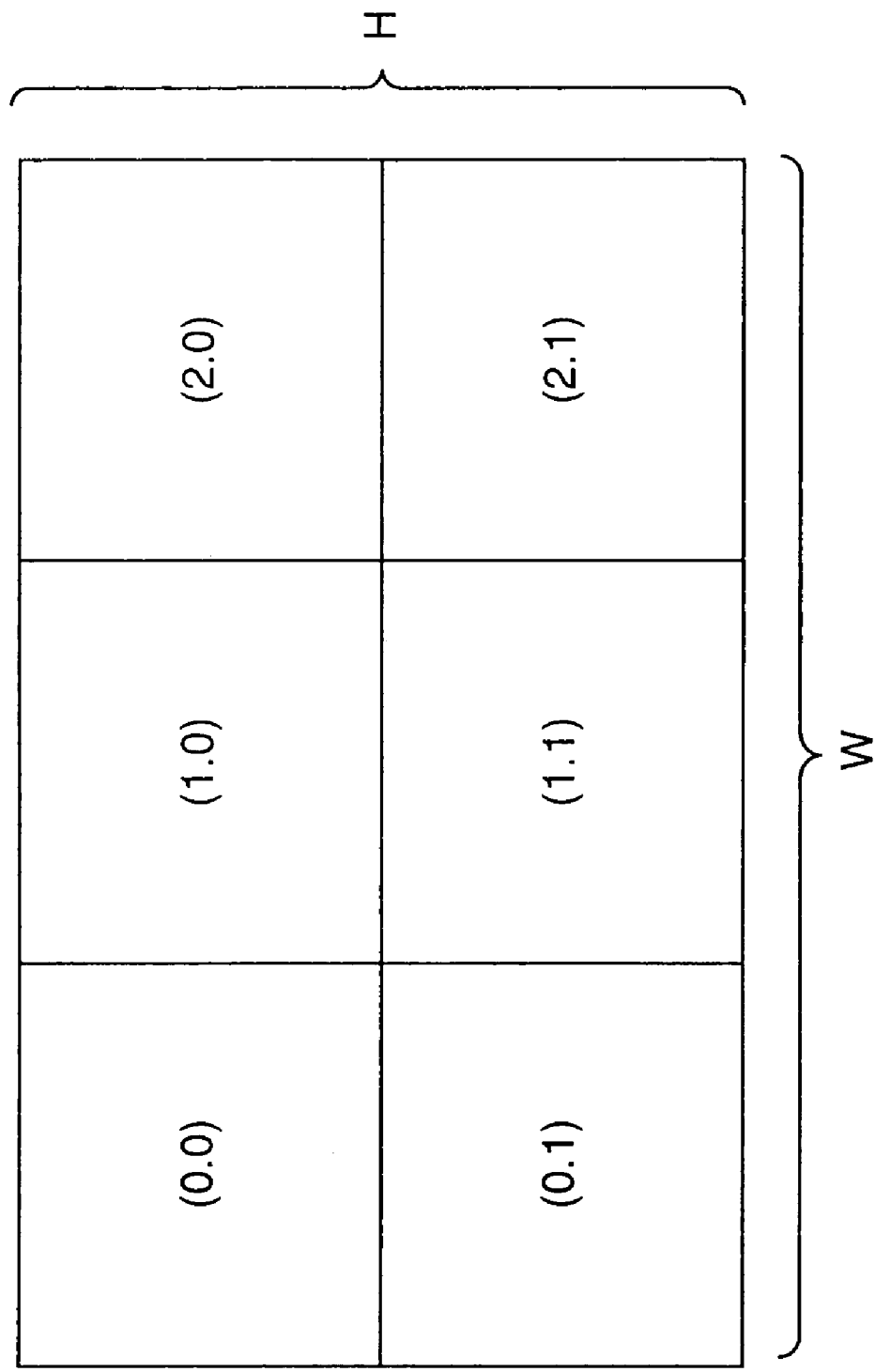
FIG. 5 is a view for explaining image segmentation for extracting an image feature amount in the first embodiment.

As shown in FIG. 5, the size of the user drawing area 21 in the first embodiment is defined by W pixels (horizontal) ×H pixels (vertical). This area is segmented into a total of six sub-areas, i.e., 3 (horizontal)×2 (vertical) sub-areas (0, 0), (1, 0), . . . , (2, 1) in turn from the upper left sub-area. The R, G, and B average values of these sub-areas are computed, and a total of 18 numerical values are used as the image feature amount of the drawn illustration.

The computation process of the image feature amount will be described below with reference to FIG. 6.

Figure 6:
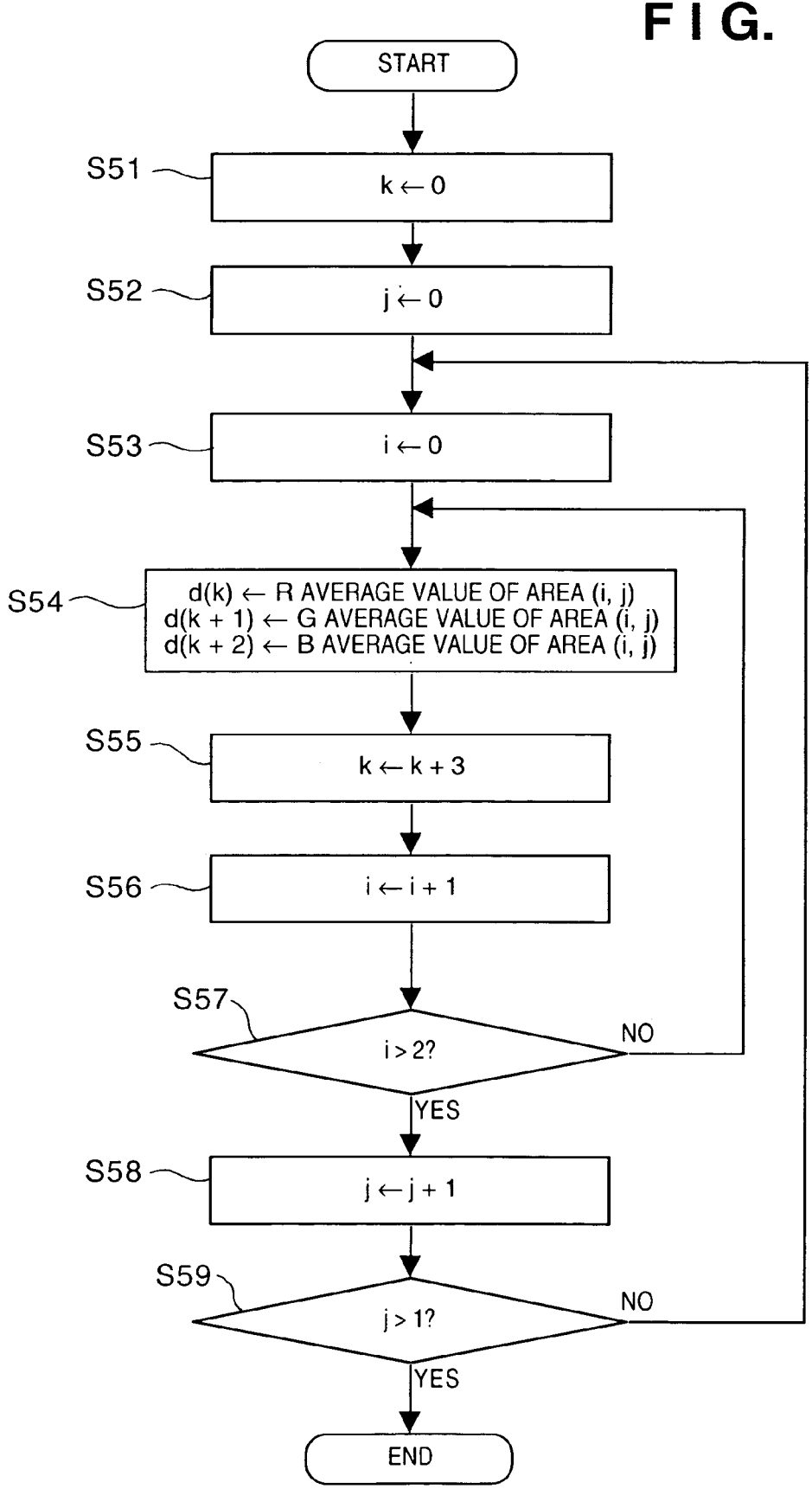
FIG. 6 is a flow chart showing the computation process of the image feature amount in the first embodiments.

FIG. 6 is a flow chart showing the computation process of the image feature amount in the first embodiment.

In step S51, a variable k is initialized to zero. In step S52, a variable j is initialized to zero. In step S53, a variable i is initialized to zero. In step S54, the R average value of a sub-area (i, j) is substituted in the k-th element d(k) of a matrix d. Also, the G and B average values are respectively substituted in d(k+1) and d(k+2). Note that the method of computing the R, G, and B average values will be described in detail later with the aid of the flow chart in FIG. 7.

In step S55, k is incremented by "3". In step S56, i is incremented by "1". In step S57, i is compared with "2". If i>2 (YES in step S57), the flow advances to step S58. On the other hand, if i≦2 (NO in step S57), the flow returns to step S54.

In step S58, the variable j is incremented by "1". In step S59, the variable j is compared with "1". If j>1 (YES in step S59), the process ends. On the other hand, if j≦1 (NO in step S59), the flow returns to step S53.

Upon completion of the process, the computed values of the image feature amount of the drawn illustration are stored in the matrix d( ) having 18 elements. Note that the drawn illustration (image) is segmented into six rectangular areas having equal areas to compute image feature amount values in this embodiment. However, the shape of the segmented area is not limited to a rectangle but may be other complicated shapes, and the number of segmented areas may be increased/decreased. When the number of segmented areas is increased/decreased, the number of elements of the image feature amount is not 18 but increases/decreases accordingly.

The method of computing the R, G, and B average values in step S54 in FIG. 6 will be described in detail below using FIG. 7.

Figure 7:
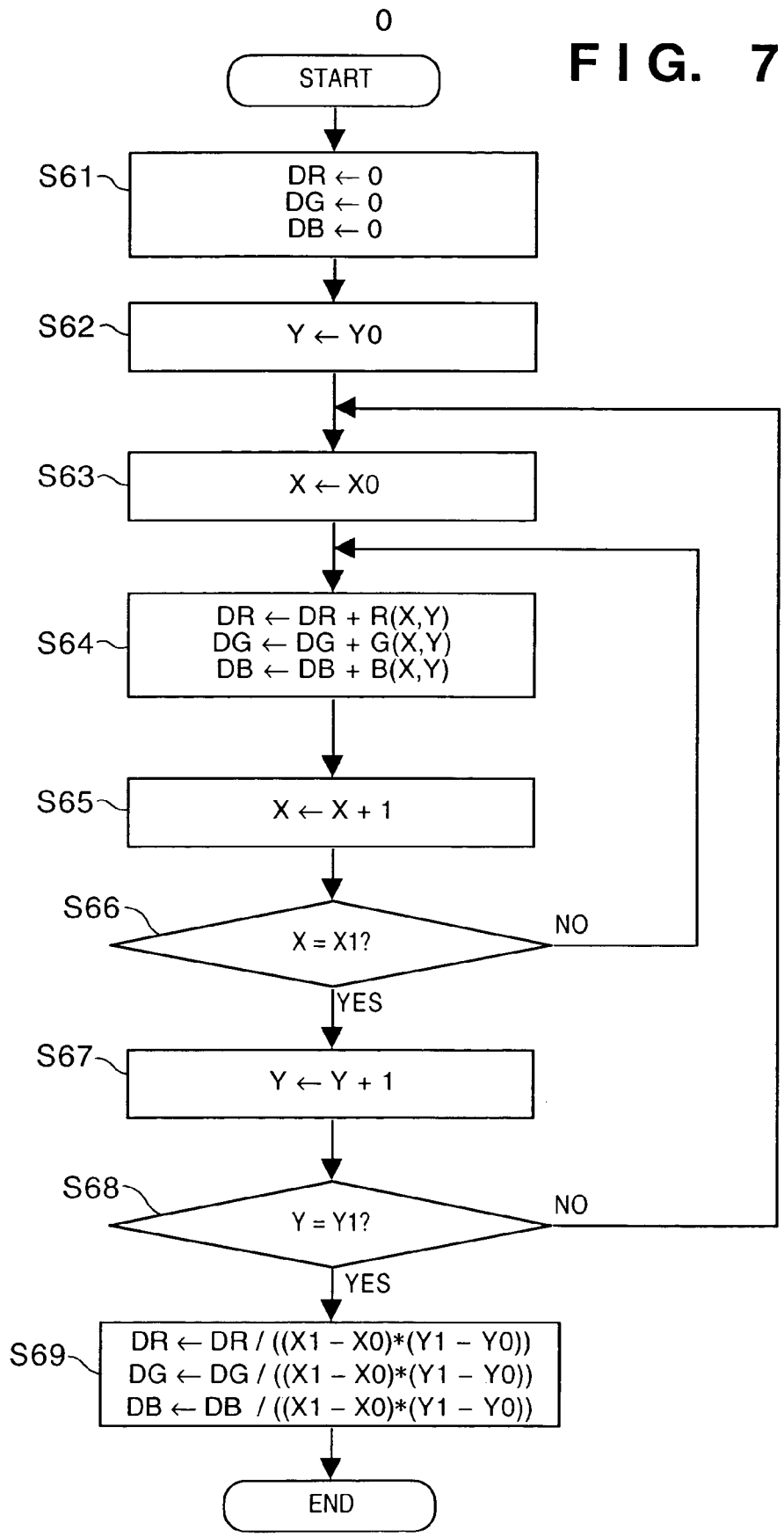
FIG. 7 is a flow chart showing the details of the method of computing the R, G, and B average values in the first embodiment.

FIG. 7 is a flow chart showing the details of the method of computing the R, G, and B average values in the first embodiment.

Assume that image data of the drawn illustration is stored in three matrices R(X, Y), G(X, Y), and B(X, Y). Note that $0 \leq X \leq W$ and $0 \leq Y \leq H$, and the start point (0, 0) is set at the upper left corner of the image. In the following flow, the R, G, and B average values of an area within the range of $X0 \leq X < X1$ and $Y0 \leq Y < Y1$ are calculated, and are respectively returned to variables DR, DG, and DB. Furthermore, since an area corresponding to the sub-area (i, j) in step S192 corresponds to:

$$X0=W*i/3 \quad X1=W*(i+1)/3$$

$$Y0=H*j/2 \quad Y1=H*(j+1)/2$$

the flow chart is executed after constants X0, X1, Y0, and Y1 are initialized, as described above.

In step S61, the variables DR, DG, and DB are initialized to zero. In step S62, a variable Y is initialized to Y0. In step S63, a variable X is initialized to X0. In step S64, R(X, Y) is added to the variable DR. Similarly, G(X, Y) and B(X, Y) are respectively added to the variables DG and DB.

In step S65, the variable X is incremented by "1". In step S66, the variable X is compared with X1. If X= X1 (YES in step S66), the flow advances to step S67. On the other hand, if X≠X1 (NO in step S66), the flow returns to step S64.

In step S67, the variable Y is incremented by "1". In step S68, the variable Y is compared with Y1. If Y= Y1 (YES in step S68), the flow advances to step S69. On the other hand, if Y≠Y1 (NO in step S68), the flow returns to step S63. In step S69, the variables DR, DG, and DB are respectively divided by (X1−X0)*(Y1−Y0). This divisor indicates the number of pixels in the area. That is, the variables DR, DG, and DB indicate the average densities obtained by dividing the sum totals of pixel densities in the area by the number of pixels.

{Description of Step S193}

In step S193, the similar image search is made on the basis of the image feature amount computed in step S192.

The hard disk device 106 stores N image data, and their image feature amounts are computed by the aforementioned process in advance and stored. Image data may be stored in a standard file format such as JPEG, FlashPix, or the like, which is known to those skilled in the art, or may be stored in a file format unique to a so-called RDBMS (relational database management system). Assume that the image feature amounts are stored in a two-dimensional matrix D(n, i) having a size N*18 (for $0 \leq n < N$, $0 \leq i \leq 18$).

At this time, an image distance S(n) between the drawn illustration (image data) and n-th image data stored in the hard disk device 106 is defined by:

$$S(n) = \sum_i (D(n, i) - d(i))^2$$

As this image distance S(n) is smaller, it is determined that image data has higher similarity.

Initially, the image distances S(n) (for $0 \leq n < N$) between all the N image data stored in the hard disk device 106 and the drawn illustration (image data) are computed. Next, a similar image search is made by selecting M (0<M<N) image data in ascending order of image distance S(n). The computation process of the image distance S(n), and the similar image search process for selecting M image data will be respectively described below using FIGS. 8 and 9.

Figure 8:
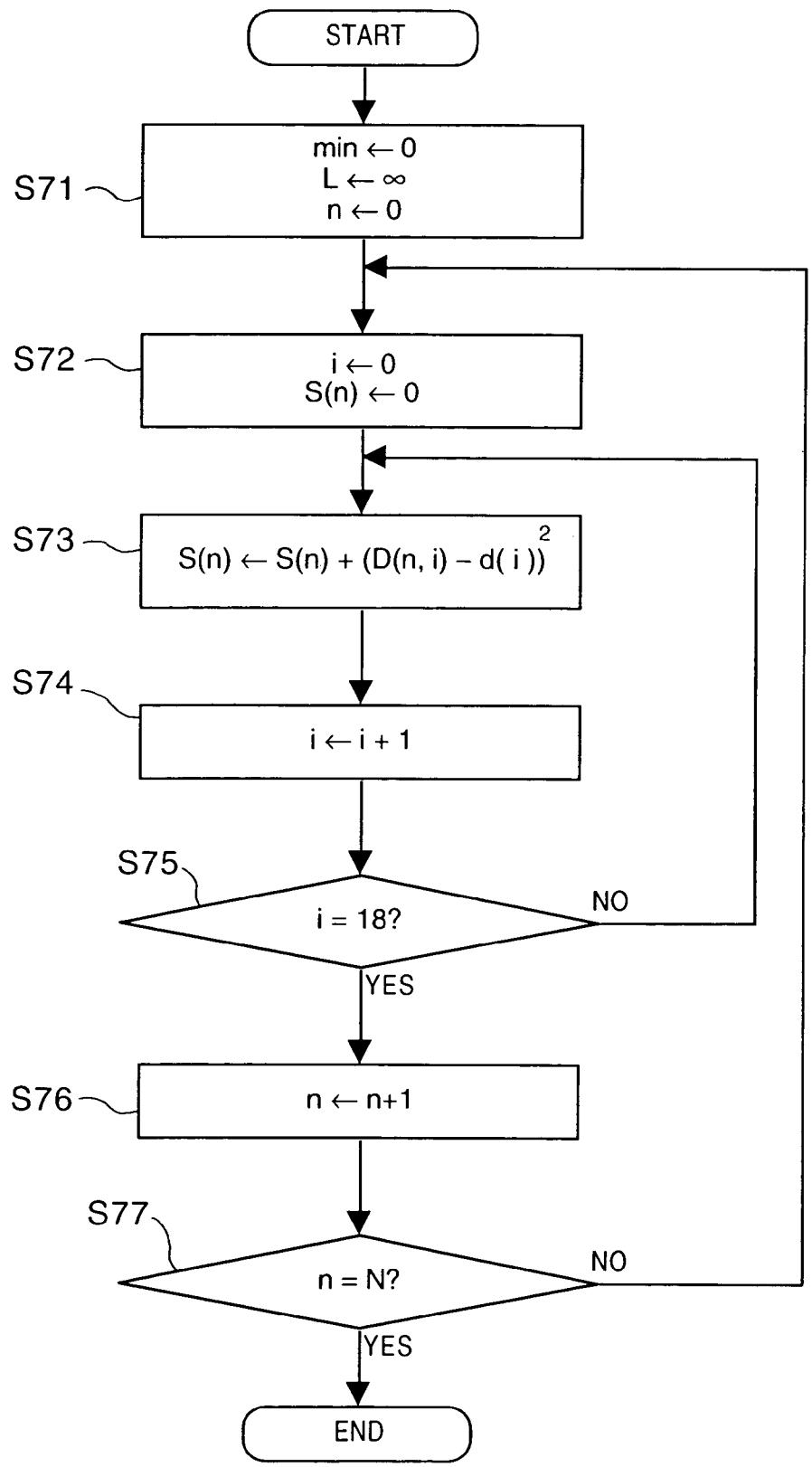
FIG. 8 is a flow chart showing the computation process of an image distance S(n) in the first embodiment.

FIG. 8 is a flow chart showing the computation process of the image distance S(n) in the first embodiment.

In step S71, variables min and n are initialized to zero, and a variable L is initialized to a sufficiently large value. In step S72, variables i and S(n) are initialized to zero. In step S73, a square of the difference between D(n, i) and d(i) is added to S(n). In step S74, the variable i is incremented by "1".

In step S75, the variable i is compared with "18". If i=18 (YES in step S75), the flow advances to step S76. On the other hand, if i≠18 (NO in step S75), the flow returns to step S73.

In step S76, the variable n is incremented by "1". In step S77, the variable n is compared with N. If n=N (YES in step S77), the processing ends. On the other hand, if n≠N (NO in step S77), the flow returns to step S72.

Upon completion of the process, the image distances S(n) between the drawn illustration (image data) and all the image data stored in the hard disk device 106 are stored in a matrix S(n). A similar image search process for selecting M image data in ascending order of image distance S(n) and storing numbers corresponding to the selected image order in a matrix T( ) will be described in detail below using FIG. 9.

Figure 9:
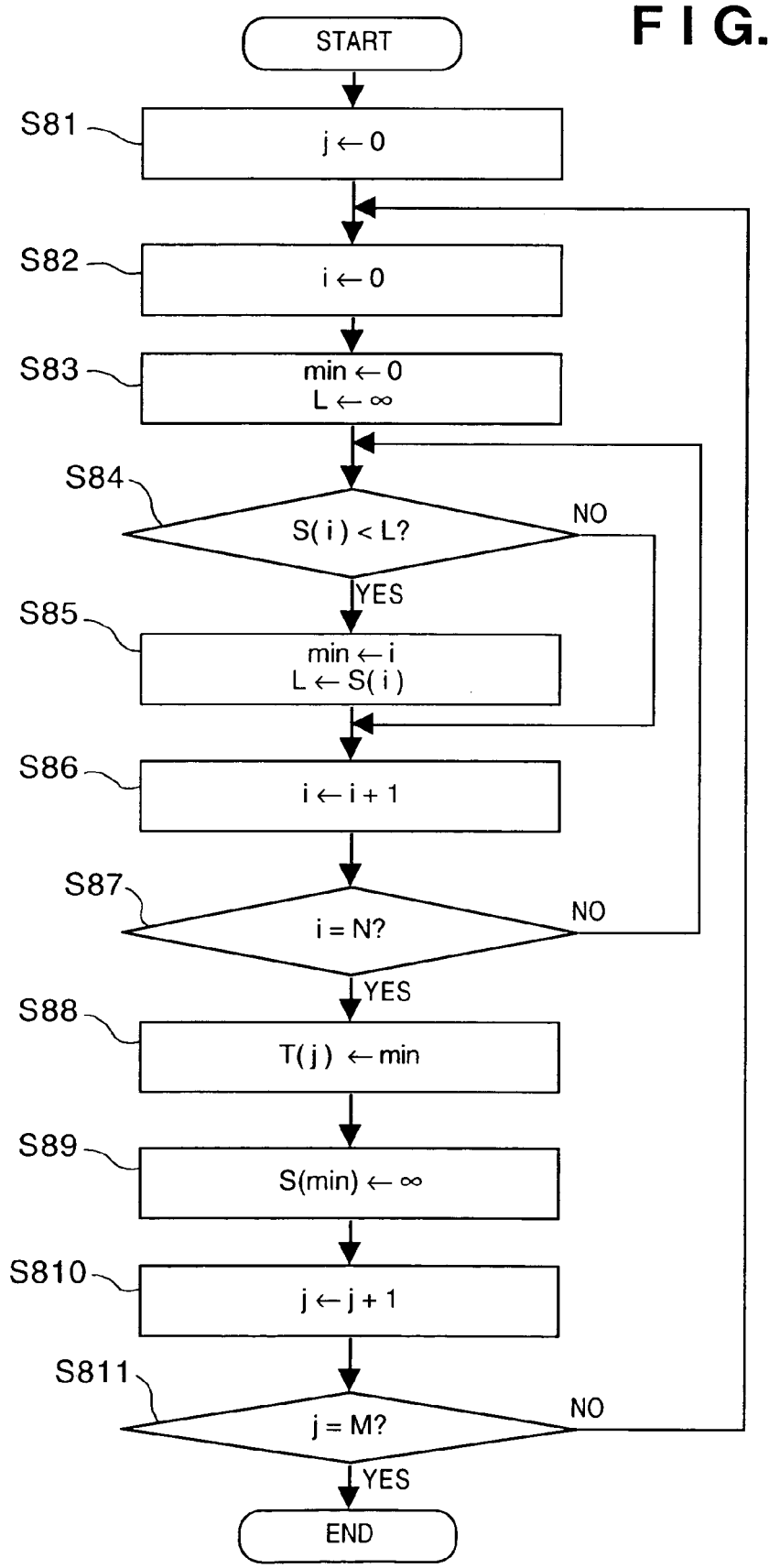
FIG. 9 is a flow chart showing the details of the similar image search process in the first embodiment.

FIG. 9 is a flow chart showing the details of the similar image search process in the first embodiment.

In step S81, a variable j is initialized to zero. In step S82, a variable i is initialized to zero. In step S83, a variable min is initialized to zero and a variable L is initialized to a sufficiently large value. In step S84, S(i) is compared with L. If S(i)<L (YES in step S84), the flow advances to step S85. On the other hand, if S(i)≧L (NO in step S84), the flow advances to step S86.

In step S85, the value i is substituted in the variable min, and S(i) is substituted in L. In step S86, the variable i is incremented by "1". In step S87, i is compared with N. If i=N (YES in step S87), the flow advances to step S88. On the other hand, if i≠N (NO in step S87), the flow returns to step S84.

In step S88, the value min is substituted in T(j). In step S89, a sufficiently large value is substituted in S(min). In step S810, the variable j is incremented by "1". In step S811, the variable j is compared with M. If j=M (YES in step S811), the processing ends. On the other hand, if j≠M (NO in step S811), the flow returns to step S82.

Upon completion of the process, the image numbers of image data stored in the hard disk device 106 are stored in the matrix T(j) (for $0 \leq j < M$) in descending order of similarity with the drawn illustration (image data).

{Description of Step S194}

The processing contents will be explained below with reference to the control window shown in FIG. 2.

The areas 26a to 26h respectively display icon images obtained by displaying similar images found by the search process in a reduced scale. The area 26a displays an image corresponding to T(0) with highest similarity, the area 26b displays an image corresponding to T(1), . . . , and the area 26h displays an image with lowest similarity among these images.

Note that the reduced-scale display may be implemented by decoding image data stored in the hard disk device 106 and displaying the decoded image on the screen in a reduced scale. When image data has low-resolution icon data for an icon like FlashPix as a standard image format, a reduced-scale image may be displayed using that icon data.

Each icon image can be "selected" using the pointing device 102a. Upon pressing the next candidate button 27, next candidates, i.e., icon images of image data corresponding to T(8) to T(15), are displayed on the areas 26a to 26h. This operation can be repeated until T(M−1) is reached.

{Description of Step S195}

It is checked in step S195 if the user has selected one of the displayed icon images. If the user has not selected any image, the flow advances to step S197. On the other hand, if the user has selected one icon image, the flow advances to step S196.

{Description of Step S196}

In step S196, the icon image selected by the user is copied onto the user drawing area 21. In this case, image data displayed on the display unit 103 may be copied or image data used for displaying a list of image data in step S194 may be used. In this manner, when an icon image close to a desired image appears as a search result, the user need only click that icon image to copy it onto the user drawing area 21, and can modify the contents of the copied image.

FIG. 2 illustrates the user drawing area 21 to have substantially the same size as those of the areas 26a to 26h for displaying icon images. However, the present invention is not limited to such specific layout. For example, the user drawing area 21 may have a relatively larger size to make drawing of an illustration easier, and the areas 26a to 26h may have a smaller size. When the clicked icon image is copied onto the user drawing area 21, the icon image data to be copied is enlarged to just fall within the user drawing area 21.

The flow then returns to step S192 to make a similar image search using the icon image copied onto the user drawing area 21 as a query criteria.

{Description of Step S197}

It is checked in step S197 if the processing end button 28 has been pressed. If the button 28 has been pressed, the processing ends. On the other hand, if the button 28 has not been pressed, the flow returns to step S191, and the user can continue to draw the illustration.

As described above, according to the first embodiment, the user can select image data stored in the hard disk device 106 instead of drawing an illustration used as a query criteria from the beginning, and can make a similar image search using an image obtained by modifying the selected image. In this manner, upon drawing an illustration, neither drawing skills nor troublesome operations are required, and an efficient similar image search process can be executed.

In the first embodiment, since a similar image search cannot be started unless an illustration is drawn on the user drawing area 21, icon image displayed on the areas 26a to 26h cannot be selected. However, this shortcoming can be removed by combining another search method.

For example, in an initial state or by user operation, icon images corresponding to image data randomly selected from those stored in the hard disk device 106 may be displayed on the areas 26a to 26h.

On the other hand, the image search method of this embodiment may be combined with a conventional search method that uses attribute information such as a keyword or the like appended to an image as a query criteria. For example, when text "cat" is input, icon images corresponding to image data associated with "cat" are selected from those stored in the hard disk device 106, and are displayed on the areas 26a to 26h. The user selects a desired one of those icon images to copy it onto the user drawing area 21, and can make a similar image search using an image obtained by modifying the copied image as a query criteria. Also, attribute information such as a date of creation, management, correction, or the like of image data may be input as a query criteria.

Second Embodiment

In the first embodiment, image data stored in the hard disk device 106 are displayed, a desired one of the displayed images is selected, and an illustration used as a query criteria is drawn on the basis of the selected image, thus realizing an efficient similar image search process. In the second embodiment, a desired color is selected from the displayed images to change the color used in drawing of an illustration, which is used as a query criteria, on the basis of the selected color, thus realizing an efficient similar image search process.

Since the arrangement and control window of the image search apparatus are the same as those in the first embodiment, a detailed description thereof will be omitted.

An outline of the processes executed by the image search apparatus of the second embodiment will be explained below with reference to FIG. 10.

Figure 10:
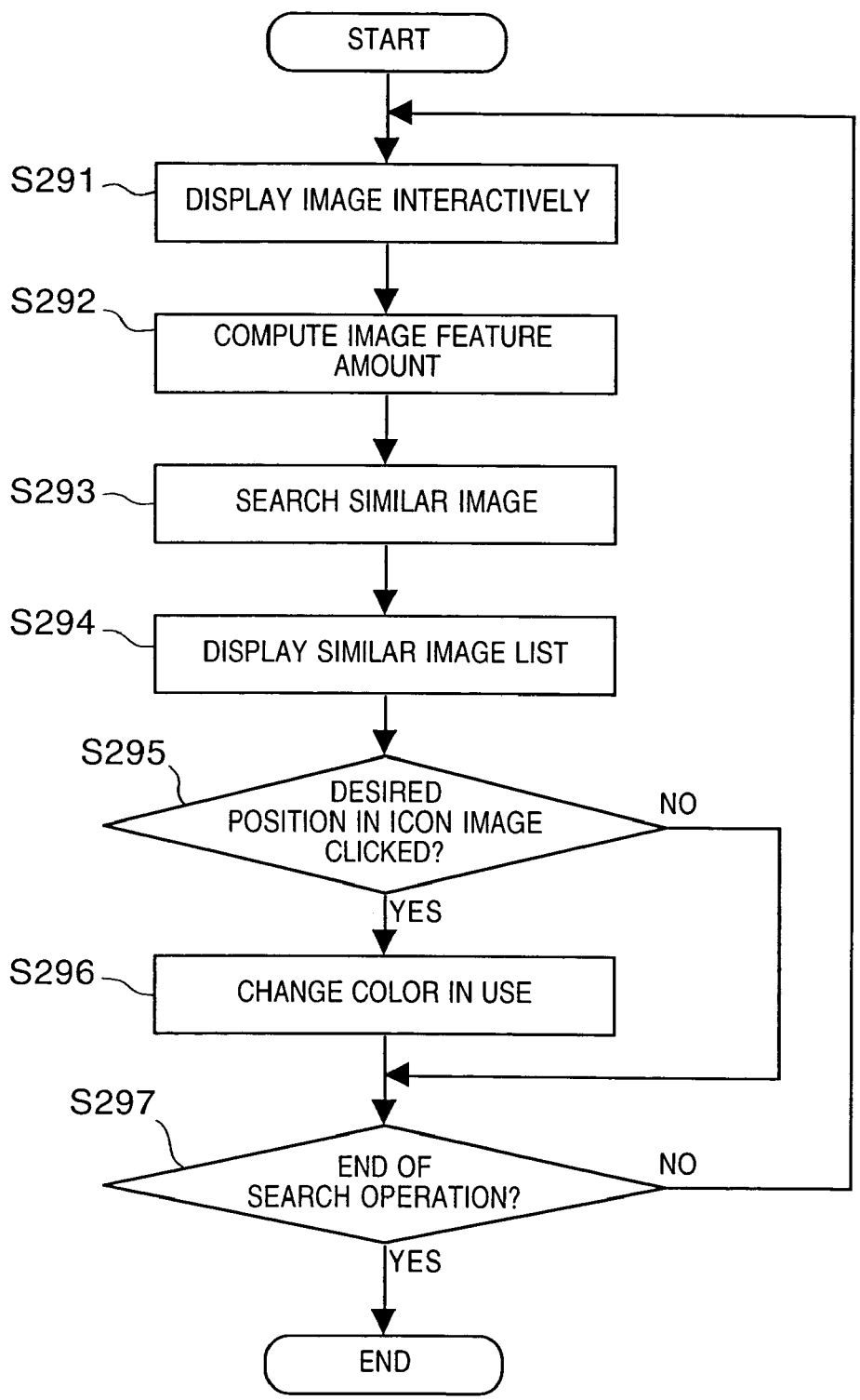
FIG. 10 is a flow chart showing an outline of the processes executed by an image search apparatus of the second embodiment.

FIG. 10 is a flow chart showing an outline of the processes executed by the image search apparatus of the second embodiment.

Note that the same step numbers denote the same steps as those in the flow chart in FIG. 3 of the first embodiment, and a detailed description thereof will be omitted.

It is checked in step S295 if the user has clicked a point in the displayed icon image where a desired color is present while indicating that point with the cursor 22. If the user has clicked a given point (YES in step S295), the flow advances to step S296 to set the color at the position of the cursor 22 upon clicking in step S295 to be the color used in drawing. On the other hand, if the user has not clicked any point (NO in step S295), the flow advances to step S297.

It is checked in step S297 if search operation is to end. If search operation is not to end (NO in step S297), the flow returns to step S191. On the other hand, if search operation is to end (YES in step S297), the processing ends.

With the aforementioned processes, even when icon images themselves displayed as the search results on the areas 26a to 26h are not desired ones, if a portion of the icon image includes a color that the user wants to use in drawing of an illustration, the user moves the cursor 22 to the portion where the color is present, and clicks the mouse, thereby automatically setting that color as that used in drawing. Using the set color, the user can continue to draw the illustration on the user drawing area 21.

The details of the processes executed in steps S295 to S297 will be described below.

{Description of Step S295}

It is checked in step S295 if the user has clicked a point in the displayed icon image list while indicating that point by the cursor 22. If the user has not clicked any point, the flow advances to step S297. If the user has clicked a given point, the flow advances to step S296.

{Description of Step S296}

In step S296, the color, which is being used in drawing of an illustration, is set at a pixel value at the clicked position. On the control window, the color of the cursor 22 is replaced by the set color, thus informing the user that the color of the cursor 22 has changed. Also, the color selection scroll bars 23 are changed to indicate the R, G, and B values of the set color. Normally, the color of the cursor 22 is changed when the user operates the color selection scroll bars 23. However, in this case, the color selection scroll bars 23 are used to inform the user of the color set by the aforementioned method. The color set in this step is used to draw an illustration in step S191.

Note that the pixel value used for setting the color may be obtained by copying image data displayed on the display unit 103 or image data corresponding to icon images displayed in a list in step S194. Depending on the display unit 103, both these image data may be equal to each other, but in general, the former data is easy to handle, and the latter data has higher precision. For example, when image data is compressed by JPEG and is saved in the hard disk device 106, each pixel value is expressed by 24 bits, but the display unit 103 often makes a display while lowering the data precision to 8 bits, 15 bits, or 16 bits.

{Description of Step S297}

It is checked in step S297 if the processing end button 28 has been pressed. If the button 28 has been pressed, the processing ends. On the other hand, if the button 28 has not been pressed, the flow returns to step S191, and the user can continue to draw the illustration.

As described above, according to the second embodiment, in order to set or change the color used in drawing of an illustration, the user need only move the cursor 22 to the position of a desired color in an image displayed on the window and click that position in place of making designation (using the color selection scroll bars 23) by means of R, G, and B values, which does not always come as an intuitive method for the user. In this manner, upon drawing an illustration, neither drawing skills nor troublesome operations are required, and an efficient similar image search process can be executed.

In the second embodiment, the color used in drawing an illustration is set using icon images displayed as search results. However, another method may be used. For example, if a color can be selected from the illustration on the user drawing area 21, the moving amount of the cursor 22 can be reduced, thus further improving the work efficiency.

In a multi-task OS represented by Windows available from Microsoft Corp., a plurality of applications can be started and can be simultaneously displayed on a single screen. When application software implemented by this embodiment, and another software, e.g., a WWW browser, photo-retouch software, or the like are simultaneously displayed to allow to use a color used in another software, the color selection range can be broadened, and the color used in drawing of an illustration can be selected more efficiently.

On the other hand, when the pointing device 102a having a plurality of buttons including at least first and second buttons is used, a method of setting a color used in drawing an illustration can be selected according to user's purposes. For example, when the user has pressed the first button, the method of setting a color used in drawing an illustration described in the second embodiment is selected; when the user has pressed the second button, a method of setting a color used in drawing an illustration by another software is selected. These methods of setting a color used in drawing an illustration may be selected by forming dedicated buttons on the control window shown in FIG. 2 in place of using the buttons of the pointing device 102a.

The color of the pixel value at the position indicated by the cursor 22, which is controlled by the pointing device 102a, is used as a color used in drawing of an illustration. However, since an image normally contains noise, the color that the user requires does not always match the pixel value at that point. At this time, when the average value of the pixel values contained in a small region, e.g., a 3×3 (pixel) square region having the position indicated by the cursor 22 as the center is used as the color used in drawing of an illustration, the influences of noise can be suppressed.

In the first and second embodiments, the mouse is used as the pointing device 102a. However, the present invention is not limited to such specific pointing device. For example, when a pen tablet that allows pen input is used, the operator can efficiently draw an illustration. Also, when a touch screen, which is integrated with the display unit 103 and allows the user to directly draw an illustration while observing the displayed window, is used, more intuitive drawing can be achieved. In addition, any other pointing devices may be used as long as they can input information to the computer system.

In step S194, reduced-scale images corresponding to image data as the processing result of the similar image search process are displayed in a two-dimensional matrix. However, the reduced-scale images may be lined up in a horizontal array (one-dimensionally) or may be three-dimensionally displayed in consideration of information in the depth direction. For example, images with higher similarity values may be displayed on the front side (to have larger image sizes), and images with lower similarity values may be displayed on the far side (to have smaller image sizes), thus achieving a list display which is easy to understand at a glance.

Third Embodiment

Upon drawing an illustration used as a query criteria, the illustration drawing method (first drawing method) described in the first embodiment, and that (second drawing method) described in the second embodiment may be selectively executed. For example, when the pointing device 102a having a plurality of buttons including at least first and second buttons is used, the drawing method can be selected according to user's purposes. For example, when the user has pressed the first button, the first drawing method is selected; when the user has pressed the second button, the second drawing method is selected. In place of using the buttons of the pointing device 102a, the first or second drawing method may be selected by forming dedicated buttons on the control window shown in FIG. 2.

Also, these drawing methods can be combined with the method of setting a color used in drawing of an illustration.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the flow charts shown in FIG. 3, FIG. 4, and FIGS. 6 to 10.

As many apparently widely different embodiments of the present invention can be made without departing from the spirit and scope thereof, it is to be understood that the invention is not limited to the specific embodiments thereof except as defined in the appended claims.

What is claimed is:

1. An image search apparatus for searching an image database for desired image data, the image database containing a plurality of stored image data in correspondence with image feature amounts for each image data of the plurality of stored image data stored in the image database, said apparatus comprising:
    an input device for inputting a search condition;
    a selector for selecting image data, designated by a user, from image data displayed as a result of a search, corresponding to the search condition input by said input device, of the plurality of stored image data from the image database;

an image feature amount computer for computing an image feature amount of the image data selected by said selector; and an image similarity computer for computing an image similarity on the basis of the image feature amount computed by said image feature amount computer and the image feature amounts of the plurality of stored image data stored in the image database.

2. An image search apparatus for searching an image database for image data, the image database containing a plurality of stored image data in correspondence with image feature amounts for each image data of the plurality of stored image data stored in the image database, said apparatus comprising:

receiving means for receiving a search condition;

display control means for controlling to display a plurality of image data obtained as a result of a search, corresponding to the search condition received by said receiving means, of the plurality of stored image data contained in the image database;

selection means for selecting image data, designated by a user, from the plurality of image data displayed by said display means as a result of the search;

image feature amount obtaining means for obtaining an image feature amount of the image data selected by said selection means; and image similarity computing means for computing an image similarity on the basis of the image feature amount obtained by said image feature amount obtaining means and the image feature amounts of the plurality of stored image data stored in the image database.

3. An apparatus according to claim 2, wherein said display means comprises search means for searching for the desired image data by designating attribute information appended to the image data, and wherein when a search is made by said search means, said display means displays a list of image data found by the search of said search means.

4. An apparatus according to claim 2, wherein the image data selected by said selection means is copied in a drawing area, and wherein said image similarity computing means computes the image similarity on the basis of an image feature amount, computed by said image feature amount computing means, of the image data copied in the drawing area and the image feature amounts of the plurality of stored image data stored in the image database.

5. An apparatus according to claim 4, further comprising modifying means for modifying the image data copied in the drawing area, wherein said image similarity computing means computes the image similarity on the basis of an image feature amount, computed by said image feature amount computing means, of the image data modified by said modifying means and the image feature amounts of the plurality of stored image data stored in the image database.

6. An apparatus according to claim 4, wherein the drawing area and the plurality of image data are displayed in the same window.

7. An apparatus according to claim 4, wherein the plurality of image data displayed by said display means is displayed on the basis of the image similarity computed by said image similarity computing means.

8. An image search method for searching an image database for image data, the image database containing a plurality of stored image data in correspondence with image feature amounts for each image data of the plurality of stored image data stored in the image database, said apparatus comprising:

a receiving step of receiving a search condition;

a selection step of selecting image data, designated by a user, from a plurality of image data displayed as a search result obtained by a search, corresponding to the search condition received in said receive step, obtained by a search of the plurality of stored image data contained in the image database;

an image feature amount obtaining step of obtaining an image feature amount of the image data selected by said selection means; and an image similarity computing step of computing image similarity on the basis of the image feature amount obtained in said image feature amount obtaining step and the image feature amounts of the plurality of stored image data stored in the image database.

9. A method according to claim 8, further comprising:

a display step of displaying the plurality of image data obtained as a result of the search performed on the plurality of stored image data contained in the image database; and a search step of searching for the desired image data by designating attribute information appended to the image data, wherein the display step includes a step of displaying a list of image data obtained as a result of the search performed in said search step.

10. A method according to claim 8, wherein the image data selected in said selection step is copied in a drawing area, and wherein said image similarity computing step includes computing the image similarity on the basis of an image feature amount, computed in said image feature amount computing step, of the image data copied in the drawing area and the image feature amounts of the plurality of stored image data stored in the image database.

11. A method according to claim 10, further comprising the a modifying step of modifying the image data copied in the drawing area, wherein said image similarity computing step includes computing the image similarity on the basis of an image feature amount, computed in said image feature amount computing step, of the image data modified in said modifying step and the image feature amounts of the plurality of stored image data stored in the image database.

12. A method according to claim 10, wherein the plurality of image data displayed in said display step is displayed on the basis of the image similarity computed in said image similarity computing step.

13. A method according to claim 8, wherein the drawing area and the plurality of image data are displayed in the same window.

14. A computer readable memory for storing a program executing an image search method for searching an image database for image data, the image database containing a plurality of stored image data in correspondence with image feature amounts for each image data of the plurality of stored image data stored in the image database, said program comprising:

program code for receiving a search condition;

program code for selecting image data, designated by a user, from a plurality of image data displayed as a search result obtained by a search, corresponding to the search condition received by said receive program code, of the plurality of stored image data from the image database;

program code for obtaining an image feature amount of the image data selected by said selection program code; and program code for computing image similarity on the basis of the image feature amount obtained in said image feature amount obtaining program code and the image feature amounts of the plurality of stored image data stored in the image database.

15. An image search apparatus for searching an image database for image data, the image database containing a plurality of stored image data in correspondence with image feature amounts for each image data of the plurality of stored image data stored in the image database, said apparatus comprising:

receiving means for receiving handwritten information;

display control means for controlling to display a plurality of image data obtained as a result of a search of the plurality of stored image data in the image database, the plurality of stored image data being searched on the basis of the handwritten information inputted by said input means;

selection means for selecting color information of image data designated by a user from the plurality of image data displayed by said display control means as a result of the search;

image feature amount computing means for computing an image feature amount of an image drawn in a drawing area, including the color information of the image data selected by said selection means; and image similarity computing means for computing an image similarity on the basis of the image feature amount computed by said image feature amount computing means, and the image feature amounts of the plurality of stored image data stored in the image database.

16. An apparatus according to claim 15, wherein the color information of the image data is selected by said selection means by indicating one pixel in the image data.

17. An apparatus according to claim 15, wherein the color information of the image data is selected by said selection means by indicating a predetermined region in the image data.

18. An apparatus according to claim 17, wherein the color information of the image data selected by indicating the predetermined region in the image data by said selection means is an average value of pixel values contained in a small region.

19. An apparatus according to claim 15, wherein the color information of the image data selected by said selection means is selected on the basis of an image drawn on the drawing area.

20. An apparatus according to claim 15, wherein said image feature amount computing means computes the image feature amount of the drawn image each time the image in the drawing area is modified.

21. An apparatus according to claim 15, further comprising display control means for controlling a display of the drawing area within a display window displayed by said display means.

22. An image search method for searching an image database for image data, the image database containing a plurality of stored image data in correspondence with image feature amounts for each image data of the plurality of stored image data stored in the image database, said method comprising:

a receiving step of receiving handwritten information;

a selection step of selecting color information of image data, designated by a user, from a plurality of image data displayed as a search result obtained by a search of the plurality of stored image data in the image database, wherein the search being performed on the basis the handwritten information received in said receive step;

an image feature amount computing step of computing an image feature amount of an image drawn in a drawing area, including the color information of the image data selected in said selection step; and an image similarity computing step of computing an image similarity on the basis of the image feature amount computed in the image feature amount computing step and the image feature amounts of the plurality of stored image data stored in the image database.

23. A method according to claim 22, wherein the color information of the image data selected in said selection step is selected by indicating one pixel in the image data.

24. A method according to claim 22, wherein the color information of the image data selected in said selection step is selected by indicating a predetermined region in the image data.

25. A method according to claim 24, wherein the color information of the image data obtained by indicating the predetermined region in said selection step is an average value of pixel values contained in a small region.

26. A method according to claim 22, wherein the color information of the image data selected in said selection step is selected on the basis of an image drawn in the drawing area.

27. A method according to claim 22, wherein the image feature amount computing step includes a step of computing the image feature amount of the drawn image every time the image in the drawing area is modified.

28. A method according to claim 22, further comprising:

a display step of displaying the plurality of image data obtained from a search of the plurality of stored image data stored in the image database; and a display control step, of controlling to display the drawing area within a display window displayed in said display step.

29. A computer readable memory for storing a program executing an image search method for searching an image database for image data, the image database containing a plurality of stored image data in correspondence with image feature amounts for each image data of the plurality of stored image data stored in the image database, said program comprising:

program code for receiving handwritten information;

program code for selecting color information of image data, designated by a user, from a plurality of displayed image data obtained by a search of the plurality of stored image data stored in the image database, wherein the search being performed on the basis of the handwritten information received by said receiving program code;

program code for computing an image feature amount of an image drawn in a drawing area, including color information of the image data selected by said selection program code; and program code for computing an image similarity on the basis of the image feature amount computed by said image feature amount computing program code and the image feature amounts of the plurality of stored image data stored in the image database.

30. A program code stored on a computer readable medium for controlling an image search apparatus for searching an image database for image data, the image database containing a plurality of stored image data in correspondence with image feature amounts for each of the plurality of stored image data stored in the image database, said program code comprising:

program code for receiving an search condition;

program code for selecting image data, designated by a user, from a plurality of image data displayed as a result of a search, corresponding to the search condition, of the plurality of stored image data from the image database;

program code for obtaining an image feature amount of the image data selected by said selection step program code; and program code for computing an image similarity on the basis of the image feature amount computed by said image feature amount computing program code and the image feature amounts of the plurality of stored image data stored in the image database.

31. A program code stored on a computer readable medium for controlling an image search apparatus for searching an image database for image data, the image database containing a plurality of stored image data in correspondence with image feature amounts for each of the plurality of stored image data stored in the image database, said program code comprising:

program code for receiving handwritten information;

program code for selecting color information of image data, designated by a user, from a plurality of displayed image data obtained by a search of the plurality of stored image data stored in the image database, wherein the search being performed on the basis of the handwritten information received by said receive program code;

program code for computing an image feature amount of an image drawn in a drawing area, including color information of the image data selected by said selection program code; and program code for computing an image similarity on the basis of the image feature amount computed by said image feature amount computing program code and the image feature amounts of the plurality of stored image data stored in the image database.

* * * * *

UNITED STATES PATENT AND TRADEMARK OFFICE
CERTIFICATE OF CORRECTION

| | |
|---|---|
| PATENT NO. | : 6,968,095 B1 |
| APPLICATION NO. | : 09/384967 |
| DATED | : November 22, 2005 |
| INVENTOR(S) | : Kunihiro Yamamoto et al. |

It is certified that error appears in the above-identified patent and that said Letters Patent is hereby corrected as shown below:

COLUMN 1:
Line 40, "understood" should read -- understand --.

COLUMN 5:
Line 30, "embodiments;" should read -- embodiment; --.

COLUMN 13:
Line 11, "allow" should read -- allow one --.

COLUMN 15:
Line 61, "claim 4," should read -- claim 2, --.

COLUMN 16:
Line 8, "receive" should read -- receiving --; and
Line 41, "the" (first occurrence) should be deleted.

COLUMN 17:
Line 1, "receive" should read -- receiving -- .

COLUMN 18:
Line 9, "basis" should read -- basis of --; and
Line 10, "receive" should read -- receiving --.

COLUMN 19:
Line 11, "an" should read -- a --.

COLUMN 20:
Line 13, "receive" should read -- receiving --.

Signed and Sealed this

Thirteenth Day of February, 2007

JON W. DUDAS
*Director of the United States Patent and Trademark Office*